(12) United States Patent
Jung et al.

(10) Patent No.: US 9,366,558 B2
(45) Date of Patent: Jun. 14, 2016

(54) HETERONUCLEAR RADIOISOTOPE NANOPARTICLE OF CORE-SHELL STRUCTURE AND PREPARATION METHOD THEREOF

(71) Applicant: Korea Atomic Energy Research Institute, Daejeon (KR)

(72) Inventors: Sung-Hee Jung, Daejeon (KR); Seong-Ho Choi, Daejeon (KR); Jong-bum Kim, Daejeon (KR); Jinho Moon, Daejeon (KR); Jin-Hyuck Jung, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 0 days.

(21) Appl. No.: 14/681,702

(22) Filed: Apr. 8, 2015

(65) Prior Publication Data
US 2015/0241257 A1   Aug. 27, 2015

Related U.S. Application Data

(62) Division of application No. 13/644,957, filed on Oct. 4, 2012, now abandoned.

(30) Foreign Application Priority Data

Oct. 5, 2011   (KR) .................. 10-2011-0101302

(51) Int. Cl.
| | |
|---|---|
| *G21H 5/02* | (2006.01) |
| *G01F 1/704* | (2006.01) |
| *B05D 1/00* | (2006.01) |
| *G21G 4/06* | (2006.01) |
| *B01J 13/18* | (2006.01) |
| *B82Y 40/00* | (2011.01) |

(52) U.S. Cl.
CPC ............. *G01F 1/7042* (2013.01); *B01J 13/18* (2013.01); *B05D 1/00* (2013.01); *G21G 4/06* (2013.01); *G21H 5/02* (2013.01); *B82Y 40/00* (2013.01); *Y10S 977/902* (2013.01)

(58) Field of Classification Search
CPC ......... G01F 1/7042; G21H 5/02; B01J 13/18; B05D 1/00; B82Y 40/00; G21G 4/06; Y10S 977/209
See application file for complete search history.

(56) References Cited

U.S. PATENT DOCUMENTS

| | | | | |
|---|---|---|---|---|
| 5,025,160 | A | * | 6/1991 | Watt ..................... G01F 1/7042 250/356.1 |
| 5,880,375 | A | * | 3/1999 | Bielski et al. ............. G01F 1/74 73/861.05 |

OTHER PUBLICATIONS

Liang Wang and Yusuke Yamauchi, "Autoprogrammed Synthesis of Triple-Layered Au@Pd@Pt Core-Shell Nanoparticles Consisting of a Au@Pd Bimetallic Core and Nanoporous Pt Shell." J. Am. Chem. Soc. Sep. 2010, vol. 132, pp. 13636-13638. <doi:10.1021/ja105640p>.*

(Continued)

*Primary Examiner* — Mark R Gaworecki
(74) *Attorney, Agent, or Firm* — Sheridan Ross P.C.

(57) ABSTRACT

Heteronuclear radioisotope nanoparticle of core-shell structure and a preparation method thereof are provided. The Heteronuclear radioisotope nanoparticle of core-shell structure comprising core of two different radioisotopes selected from a group consisting of $^{198}$Au, $^{63}$Ni, $^{110m}$Ag, $^{64}$Cu, $^{60}$Co, $^{192}$Ir and $^{103}$Pd, and a shell comprising $SiO_2$ surrounding the core. The Heteronuclear radioisotope nanoparticle of core-shell can be used as a tracer for the purpose of detecting variation of volume ratio or for the evaluation of the behavior characteristic of a water resource, based on information about phase ratio in the flow of multiphase fluid existing in a process which is operated under extreme condition such as high temperature and/or high pressure conditions.

5 Claims, 13 Drawing Sheets

(56) References Cited

OTHER PUBLICATIONS

Sung-Hee Jung, Kyo-Il Kim, Jung-Ho Ryu, Seong-Ho Choi, Jong-Bum Kim, Jin-Ho Moon, and Joon-Ha Jin, "Preparation of radioactive core-shell type 198Au@SiO2 nanoparticles as a radiotracer for industrial process applications." Applied Radiation and Isotopes vol. 68 (Jun. 2010) pp. 1025-1029. <doi:10.1016/j.apradiso.2010.01.021>.*

* cited by examiner

HETERONUCLEAR RADIOISOTOPE NANOPARTICLE OF CORE-SHELL STRUCTURE AND PREPARATION METHOD THEREOF

CROSS-REFERENCES TO RELATED APPLICATIONS

This patent application claims the benefit of priority from U.S. patent application Ser. No. 13/644,957, filed on Oct. 4, 2012, which claims the benefit of priority from Korean Patent Application No. 10-2011-0101302, filed on Oct. 5, 2011, the contents of which are incorporated herein by reference in its entirety.

BACKGROUND OF THE INVENTION

1. Field of the Invention

The present invention relates to heteronuclear radioisotope nanoparticle of core-shell structure and a preparation method thereof.

2. Description of the Related Art

Radioisotope refers to a matter in which atomic nucleus thereof emits radioactive rays without requiring external influence such as pressure, temperature, chemical treatment, to turn into different type of atomic nucleus. The generally available radioisotope includes $^{198}$Au, $^{63}$Ni, $^{110m}$Ag, $^{64}$Cu, $^{60}$Co, $^{192}$Ir, or $^{103}$Pd.

In the industrial application, open radioisotope generally serves as a tracer. That is, by tracing radioactive rays emitted from the radioisotope by a measuring device, it is possible to analyze the behavior of a material. Since gamma (γ) ray does not carry electricity nor does it have mass, this has less interaction with the matter and less energy loss when passing through the matter compared to the other radioactive rays. Further, since γ ray has strong penetrating power irradiated from the radioactive nanoparticles, this can penetrate through the wall of the vessel containing the fluid to easily detect the target of detection existing in the fluid.

The metal nanoparticles are generally made by electric bombardment, sodium/halide flame and encapsulation technology (SFE), chemical reduction, or electric reduction. However, the metal nanoparticles made by these methods have rather irregular granularity of the particles, and mass production is rather difficult at room temperature. Meanwhile, the radiation reduction relates to irradiating radioactive ray onto metal ion solution and generating metal nanoparticles using free radicals generated from the solution. This method has the advantages of no side reaction, and mass-productability at room temperature. By way of example, Reference 1 (S. H. Choi et al.) report about fabricating precious metal nanoparticles using radiation reduction, and using these as catalysts. Further, S. H. Choi et al. have conducted a study regarding radioactivation of the nanoparticles by irradiating neutrons thereon. Further, Reference 2 (S. D. Oh et al.) researched about loading precious nanoparticles in a carbon nano-tube to use as a fuel battery, in which the researchers studied about synthesizing nanoparticle alloy.

The researchers of References 1 and 2 used surfactant or soluble polymer as colloid stabilizer or nanoparticles loaded in a specific carrier to stabilize the nanoparticles. However, in fabricating radioactive nanoparticles, there is a risk that the colloid stabilizer itself can be activated. Therefore, it is required that the use of colloid stabilizer be minimized or the stabilizer be completely eliminated after use, in order to use the radioactive nanoparticles as a tracer. However, if the colloid stabilizer is eliminated in the fabricating process of the metal nanoparticles, aggregation can occur among the nanoparticles due to considerably low mass ratio to surface area, and as a result, the nanoparticles grow and cannot serve as a tracer for flow detection of a target of the research. In order to overcome the problem explained above, a technique to coat the metal nanoparticles with $SiO_2$ which is not activated even by the radiation of the neutron (Reference 3).

Meanwhile, Reference 4 (C. P. Winlove et al.) studied about attaching iodine-125 ($^{125}$I) as radioisotope to gold (Au) nanoparticle and mixing with natural polymer such as protein peptide to use this as a tracer. However, in implementing this to high temperature and high pressure industrial process, there is a problem that the radioisotope ($^{125}$I) is separated from the gold nanoparticle. Further, Reference 5 (A. V. S. Roberts) and 6 (M. K. Pratten) prepared colloid particles by, first, chelating $^{125}$I and $^{14}$C to polyvinylpyrrolidone as a stabilizer, and then coupling the result to colloid gold to use it as a bio-tracer. However, since radioisotopes such as $^{125}$I and $^{14}$C are adsorbed onto soil and emits low energy of radiation, it is difficult to detect the behavior in the soil sample, not to mention the flow in the industrial processing.

Accordingly, considering the fact that the measurement result with a single radioactive particle particularly on the multi phase flow does not provide information about phase ratio, the present inventors prepared heteronuclear radioisotope nanoparticle with core-shell structure in which two different types of elements as the cores are coated with $SiO_2$, to thus obtain information about the phase ratio on the multi phase flow and calculate the volume ratio, and was confirmed that the prepared nanoparticle can be used as a tracer to detect the flow behavior of the fluid, and completed the invention.

[Reference 1] S.-H Choi, Y.-P. Zhang, A. Gopalan, K.-P. Lee, H.-D. Kang, Preparation of Catalytically Efficient Precious Metallic Colloids by γ-Irradiation and Characterization, Colloids Surfaces A, 256, 165-170 (2005).

[Reference 2] S.-D. Oh, B.-K. So, S.-H. Choi, A. Gopalan, K.-P. Lee, K. R. Yoon, I. S. Choi, Dispersing of Ag, Pd, and Pt—Ru alloy nanoparticles on single-walled carbon nanotubes by γ-irradiation, Mater. Lett., 59, 1121-1124 (2005).

[Reference 3] KR 10-2010-0034499 A Apr. 1, 2010, p. 4, lines 19-24

[Reference 4] C. P. Winlove, J. Davis, A. Iacovides, A. Chabanel, Radioactive Gold Colloid as a Tracer of Macromolecules Transport, Biotechnology, 18, 569-578 (1981).

[Reference 5] A. V. S. Roberts, K. E. Williams, and J. B. LLoyd, "The Pinocytosis of $^{125}$I-Labelled Poly(vinylpyrrolidone), [$^{14}$C]Sucrose and Colloidal [198Au]Gold by Rat Yolk Sac Cultured in vitro, Biochem. J. 168, 239-244 (1977).

[Reference 6] M. K. Pratten, and J. B. Lloyd, Effects of Temperature, Metabolic Inhibitors and Some Other Factors on Fluid-Phase and Adsorptive Pinocytosisi by Rat Peritoneal Macrophages, Biochem. J., 180, 567-571 (1979).

SUMMARY OF THE INVENTION

The present invention has been made to overcome the above-mentioned disadvantages in the related art, and accordingly, an object of the present invention is to provide heteronuclear radioisotope nanoparticle of core-shell structure which is stable to be used as a tracer for detecting a variation in the volume ratio through measurement of phase ratio of multi phase flow.

Another object of the present invention is to provide a method for preparing said heteronuclear radioisotope nanoparticle of core-shell structure.

In one embodiment, Heteronuclear radioisotope nanoparticle of core-shell structure is provided, which may include a core comprising two different radioisotopes selected from a group consisting of $^{198}$Au, $^{63}$Ni, $^{110m}$Ag, $^{64}$Cu, $^{60}$Co, $^{192}$Ir and $^{103}$Pd, and a shell comprising $SiO_2$ surrounding the core. In another embodiment, a method for preparing Heteronuclear radioisotope nanoparticle of core-shell structure is provided, which may include (step 1) preparing core of the heteronuclear nanoparticle by dispersing two different types of atoms selected from a group consisting of Au, Ni, Ag, Cu, Co, Ir and Pd in water, and stabilizing the result with colloid stabilizer, (step 2) preparing nanoparticle with core-shell structure by coating the nanoparticle core prepared at step 1 with $SiO_2$ repeatedly for several times; (step 3) removing the colloid stabilizer remaining in the core-shell structure prepared at step 2 by calcining the prepared nanoparticle, and (step 4) activating the nanoparticle within the core by irradiating neutron onto the nanoparticle with the core-shell structure prepared at step 3.

According to the heteronuclear radioisotope nanoparticle of core-shell structure of an embodiment, since two different radioisotopes are integrated into one core, the nanoparticle have less oxidization or agglomeration compared to single nanoparticle, and accordingly provide higher safety. Further, since the Heteronuclear radioisotope nanoparticle of core-shell structure according to an embodiment emit heterogeneous gamma rays, the nanoparticle can be used as a tracer for the purpose of detecting flow of fluid existing in a multi phase process which is operated under extreme condition such as high temperature and/or high pressure operation, and for the detection of variation in the volume ratio or evaluation of behavior characteristic of water resource through phase ratio measurement.

The Heteronuclear radioisotope nanoparticle of core-shell structure according to an embodiment is coated with $SiO_2$ which is not activated by the irradiation of neutron, agglomeration of nanoparticles due to removal of colloid stabilizer can be prevented. Further, due to the minimum possibility that the remaining colloid stabilizer is activated during activation of the nanoparticle in the process such as removal of colloid stabilizer, the quantity and quality of the information obtainable from the radiation of the radioisotope are ensured.

BRIEF DESCRIPTION OF THE DRAWINGS

The above and/or other aspects of what is described herein will be more apparent by describing certain exemplary embodiments with reference to the accompanying drawings, in which.

DETAILED DESCRIPTION OF EXEMPLARY EMBODIMENTS

Figure 1:
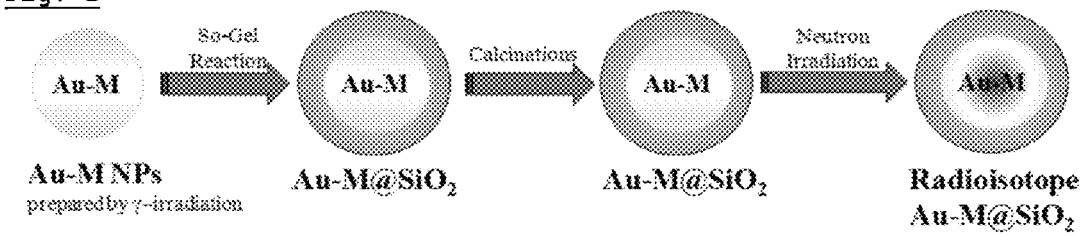
FIG. 1 is a schematic view illustrating a process of preparing heteronuclear radioisotope nanoparticle of core-shell structure according to the present invention.
Figure 2:
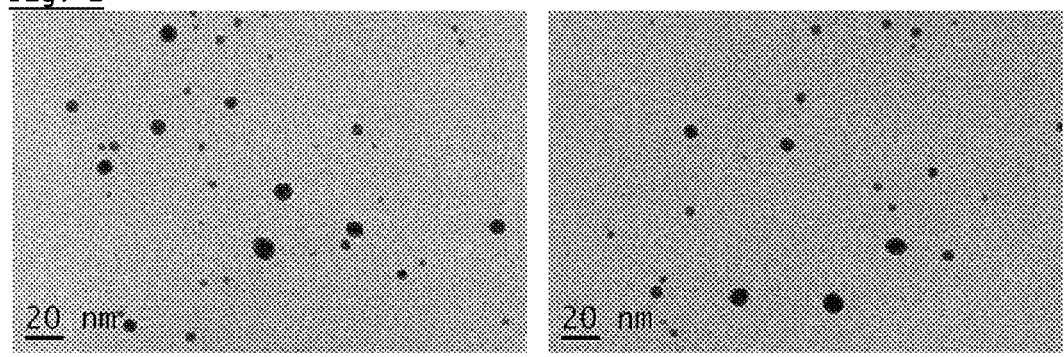
FIG. 2 is a TEM image of Au—Ag core nanoparticle stabilized with polvinylpyrrolidone prepared at Example 1 according to the present invention, in which mole ratio of core nanoparticle (i.e., Au and Ag) is 1:1.

Embodiments of the present invention will be explained in detail below.

According to an embodiment, heteronuclear radioisotope nanoparticle of core-shell structure is provided, in which core of two different types of radioisotopes is coated with $SiO_2$.

In one embodiment, the two different types of radioisotopes may include one selected from the radioisotopes including $^{198}$Au, $^{63}$Ni, $^{110m}$Ag, $^{64}$Cu, $^{60}$Co, $^{192}$Ir, $^{103}$Pd. In a preferred embodiment, the cores of the Heteronuclear radioisotope nanoparticle may use a combination of $^{198}$Au and any particle selected from the rest of the group excluding $^{198}$Au, but not limited thereto.

In one embodiment, a method for preparing Heteronuclear radioisotope nanoparticle of core-shell structure is provided, which may include:

(step 1) preparing core of the heteronuclear nanoparticle by dispersing two different types of atoms selected from a group consisting of Au, Ni, Ag, Cu, Co, Ir and Pd in water, and stabilizing the result with colloid stabilizer;

(step 2) preparing nanoparticle with core-shell structure by coating the nanoparticle core prepared at step 1 with $SiO_2$ repeatedly for several times;

(step 3) removing the colloid stabilizer remaining in the core-shell structure prepared at step 2 by calcining the prepared nanoparticle; and (step 4) activating the nanoparticle within the cores by irradiating neutron onto the nanoparticle with the core-shell structure prepared at step 3.

The respective steps of the method for preparing Heteronuclear radioisotope nanoparticle of core-shell structure according to the present invention will be explained in greater detail below.

Step 1: Preparation of Core of Heteronuclear Nanoparticle

In one embodiment, step 1 relates to preparing core of the heteronuclear nanoparticle by dispersing two difference types of particles in water and stabilizing the result with colloid stabilizer.

At step 1, the two different types of raw material for nanoparticle may be selected from Au, Ni, Ag, Cu, Co, Ir or Pd. The raw material may be used in purified form, or used along with all the compounds contained therein.

At step 1, efficiency of dispersion may be enhanced by use of colloid stabilizer which prevents agglomeration among nanoparticles dispersed in water and provides stabilization effect.

Any stabilizer may be used as the colloid stabilizer, as long as the stabilizer is capable of blocking aggregation among the colloid particles and enhancing dispersion efficiency to thus provide stabilization of the particle, but in one preferred embodiment, polyvinylpyrrolidone may be used.

In one embodiment, step 1 may additionally include a step for removing oxygen present in the fluid, by performing $N_2$ purging to prevent oxidation of the matters constituting the fluid for reaction which contains the two different types of elements.

Further, step 1 may enhance stabilization effect of the heteronuclear nanoparticle by use of colloid stabilizer such as polyvinylpyrrolidone, by irradiating gamma radiation onto the colloid fluid. Time and dose of irradiating gamma radiation may be adjusted appropriately depending on need and according to the raw material of the core.

Step 2: Preparation of Heteronuclear Nanoparticle with Core-Shell Structure

Next, in step 2, nanoparticle with core-shell structure is prepared by coating the nanoparticle core prepared at step 1 with $SiO_2$ repeatedly for several times.

Accordingly, as $SiO_2$ is coated on the nanoparticle core prepared at step 1, the nanoparticle with core-shell structure in which core of two different types of elementals is covered by $SiO_2$ shell, is prepared.

To be specific, a certain amount of colloid fluid in which heteronuclear nanoparticle core are dispersed and which is stabilized with colloid stabilizer in step 1 may be prepared, mixed with a solvent such as isopropanol and added with a small amount of ammonia solution. A material to provide $SiO_2$ as a shell may then be added to coat around the core. The material to provide $SiO_2$ may include, for example, tetraethoxy orthosilicate (TEOS). The thickness of the shell may be adjusted by repeatedly adding TEOS for several times.

Step 3: Removal of Colloid Stabilizer

In step 3, colloid stabilizer is removed from the heteronuclear nanoparticle of core-shell structure which is prepared in step 2.

In step 3, the colloid stabilizer may be removed by calcining under nitrogen flow. The calcination temperature may be adjusted in accordance with the type of the colloid stabilizer used. By way of example, if polyvinylpyrrolidone is used as the colloid stabilizer, the calcination temperature may preferably be 500-600° C.

The nanoparticle after the calcining is in powder form from which stabilizer is removed. As explained above, the remaining colloid stabilizer is removed to ensure quality and quantity of the component that can be obtained in the radiation detection emitted from the radioisotope, because if the colloid stabilizer is left in the heteronuclear nanoparticle, there is the possibility that the colloid stabilizer can also be activated when the nanoparticle is activated in the following step.

Step 4: Preparation of Heteronuclear Radioisotope Nanoparticle of Core-Shell Structure Next, in step 4, the nanoparticle of core-shell structure prepared in step 3 is activated.

The activation may be performed by irradiating neutron in the nuclear reactor on the heteronuclear nanoparticle of core-shell structure prepared in step 3.

Since the heteronuclear nanoparticle of core-shell structure activated in step 4 according to the present invention emits specific radiation emitted from the respective nuclides, the nanoparticle can be used for various purposes.

Furthermore, in one embodiment, Heteronuclear radioisotope nanoparticle of core-shell structure is provided, which can be used as a tracer for the purpose of detecting movement of the fluid existing in the multi phase process driven under extreme conditions including high temperature and/or high pressure, or used for the purpose of evaluating the behavior of the water resource.

Unlike the homonuclear nanoparticle, the nanoparticle in one embodiment of the present invention has different types of heteronuclear radioisotopes as the core and thus can emit gamma ray of different characteristics. Accordingly, it is possible to measure the respective phrase ratios by analyzing information about the movements of the multi phase fluid particularly existing in high temperature and high pressure industrial processing which does not easily permit access. Further, it is also possible to calculate the volume ratio based on the information about the phase ratio of the multi phase fluid.

In general, radiation attenuation coefficient of a matter changes in accordance with the radiation energy. If two types of radiation sources that emit two different gamma energies are used, it is possible to obtain the phase ratio of the mixture. The fluid compound rate ($\alpha_i$) according to two types of gamma ray energy absorption can be calculated by:

$$I_m(e) = I_v(e)\exp\left[-\sum_{i=1}^{3} \alpha_i \mu_i(e) d\right] \quad \text{[Mathematical formula 1]}$$

where, $I_u(e)$ denotes initial value of the system which indicates the radiation amount detected in a state where the system is empty. $\mu_i$ denotes linear attenuation coefficient with respect to multi phase. By way of example, if two gamma ray energies $e_1$, $e_2$ with large differences of attenuation coefficients are selected from the respective phases of the multi phase fluid consisting of water, oil and gas, two formulae can be obtained. Since 1 is the sum of total phase ratios of the mixture, the third mathematical formula can be obtained accordingly.

If the heteronuclear radioisotope nanoparticle of core-shell structure prepared according to an embodiment of the present invention is used as a tracer for the movement of multi phase fluid, since the cores comprising two different types of radioisotopes, two gamma ray energies, i.e., $^{198}Au(e_1)$ and $^{110m}Ag$ $(e_2)$ are selected to obtain two mathematical formulae. The third mathematical formula can be obtained based on the fact that the sum of the total phase ratios of the mixture is 1.

Referring to the above examples, the three formulae obtained through mathematical formula 1 by selecting two gamma ray energies $e_1$ and $e_2$ from the multi phase fluid consisting of water, oil and gas may be expressed as follows:

$$\begin{bmatrix} R_w(e_1) & R_o(e_1) & R_g(e_1) \\ R_w(e_2) & R_o(e_2) & R_g(e_2) \\ 1 & 1 & 1 \end{bmatrix} \begin{bmatrix} \alpha_w \\ \alpha_o \\ \alpha_g \end{bmatrix} = \begin{bmatrix} R_m(e_1) \\ R_m(e_2) \\ 1 \end{bmatrix} \quad \text{[Mathematical formula 2]}$$

where, $R_W$, $R_O$, $R_g$ and $R_m$ are log values of detected radiation amounts with respect to water, oil, gas and mixture by the two gamma ray energies $e_1$ and $e_2$, respectively. $R_W$, $R_O$, $R_g$ which are necessary for the calculation, are obtained by the correction process in which the system is filled with the corresponding phases to 100% and measured. In actual measurement test, ratios $\alpha_W$, $\alpha_O$, $\alpha_g$ of the respective phases may be obtained by obtaining gamma ray energies $R_m(e_1)$ and $R_m(e_2)$ and applying these to mathematical formula 2.

By applying the above-explained example, it is possible to measure the gamma ray energy under the following condition, to obtain information about the phase ratio of the movement of the multi phase fluid by using heteronuclear radioisotope nanoparticle of core-shell structure. First, detected radiation amount $I_u(e)$ is measured as the initial value in the empty system. Then, water phase ratio $\alpha_W$, oil phase ratio $\alpha_O$, and gas phase ratio $\alpha_g$ in the mixture state are obtained by applying the log values of the measured values of $^{198}Au$ and $^{110m}Ag$ gamma ray energies emitted from: system of 100% water, system of 100% oil, and system of 100% gas to mathematical formula 2. From the above, it is possible to obtain volume ratios of the respective fluids constructing multi phase fluid.

Hereinbelow, an embodiment of the present invention will be explained in greater detail. However, an embodiment is not limited to specific examples only.

Example 1

Step 1. Preparation of Heteronuclear Nanoparticle Core by Radiation Reduction 0.19 mmol of $HAuCl_4 3H_2O$ (0.078 g) and $AgNO_3$ (0.033 g) were dispersed in tertiary distilled water (376 ml) so that Au and Ag were at 1:1 mole ratio. To the fluid in which $HAuCl_4 3H_2O$ and $AgNO_3$ were dispersed, polyvinylpyrrolidone (1 g) as colloid stabilizer and isopropanol (24 ml) were added and mixed. The reacted fluid underwent nitrogen purging to remove oxygen existing in the solution, and $^{60}Co$-$\gamma$ was irradiated for 3 hr, in a manner in which the total dose of radiation was 30 kGy. The reacted fluid was yellow before reaction, and turned into purple after irradiation so that Au—Ag nanoparticle, which was stabilized with polyvinylpyrrolidone, can be prepared.

Step 2. Preparation of Heteronuclear Nanoparticle with Core-Shell Structure by Sol-Gel Reaction Colloid fluid (4 ml), in which the Au—Ag nanoparticle core stabilized with polyvinylpyroolidone and prepared in step 1, was mixed with isopropanol (20 ml), 30 wt. % ammonia solution (0.5 ml) was added to the reaction vessel, and tetraetoxy orthosilicate (TEOS) (10 mmol) was added, and left to react for 2 hr at room temperature. As a result, nanoparticle (Au—Ag@SiO) having Au—Ag core and $SiO_2$ shell was prepared.

Step 3. Removal of Colloid Stabilizer

Polyvinylpyrrolidon, which is colloid stabilizer, was completely removed as the nanoparticle (Au—Ag@$SiO_2$) prepared in step 2 was calcined at 500° C. under nitrogen flow.

Step 4. Preparation of Heteronuclear Radioisotope Nanoparticle of Core-Shell Structure Radioisotope nanoparticle Au—Ag@$SiO_2$ (20 mg) having Au—Ag core and $SiO_2$ shell was prepared, by irradiating neutrons to the nanoparticle ($^{198}Au$—$^{110m}Ag$@$SiO_2$) prepared in step 3 in the nuclear reactor (Hanaro, neutron irradiation: $2.8 \times 10^{13}/cm^2$ s) designed for research at the Korea Atomic Energy Research Institute.

Example 2

The radioisotope nanoparticle having Au—Ni core and $SiO_2$ shell was prepared in the same manner as that in Example 1, except that Ni instead of Ag was used as the nuclides of the nanoparticle core and 0.19 mmol of $HAuCl_4 3H_2O$ (0.078 g) and $Ni(NO_2)_2 6H_2O$ (0.055 g) were used to 1:1 mole ratio.

Example 3

The radioisotope nanoparticle having Au—Co core and $SiO_2$ shell was prepared in the same manner as that in Example 1, except that Co instead of Ag was used as the nuclides of the nanoparticle core and 0.19 mmol of $HAuCl_4 3H_2O$ (0.078 g) and $CoCl_2 6H_2O$ (0.045 g) were used to 1:1 mole ratio.

Example 4

The radioisotope nanoparticles having Au—Cu cores and $SiO_2$ shells were prepared in the same manner as that in Example 1, except that Cu instead of Ag was used as the nuclides of the nanoparticle cores and 0.19 mmol of $HAuCl_4 3H_2O$ (0.078 g) and $CuCl_2 2H_2O$ (0.032 g) were used to 1:1 mole ratio.

Example 5

The radioisotope nanoparticle having Au—Ir core and $SiO_2$ shell was prepared in the same manner as that in Example 1, except that Ir instead of Ag was used as the nuclides of the nanoparticle core and 0.19 mmol of HAuCl$_4$3H$_2$O (0.078 g) and IrCl$_4$.xH$_2$O (0.063 g) were used to 1:1 mole ratio.

Analysis:

1. Transmission Electron Microscopy (TEM)

Figure 3:
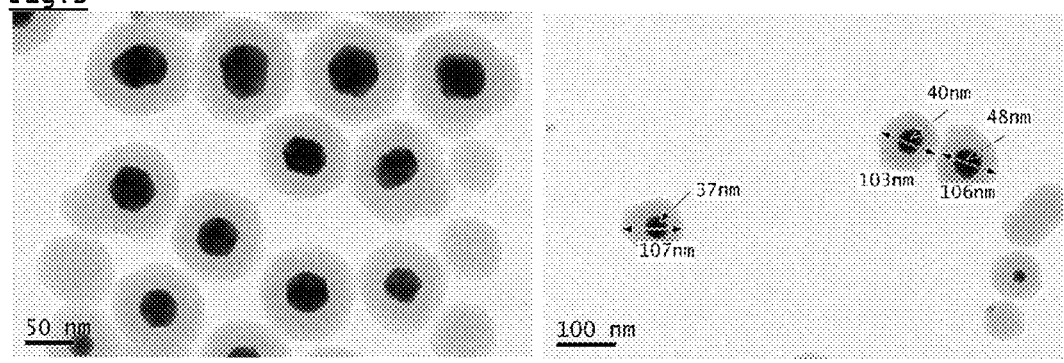
FIG. 3 is a TEM image of Au—Ag@ $SiO_2$, which is the heteronuclear radioisotope nanoparticle of core-shell structure prepared at Example 1 according to the present invention.
Figure 4:
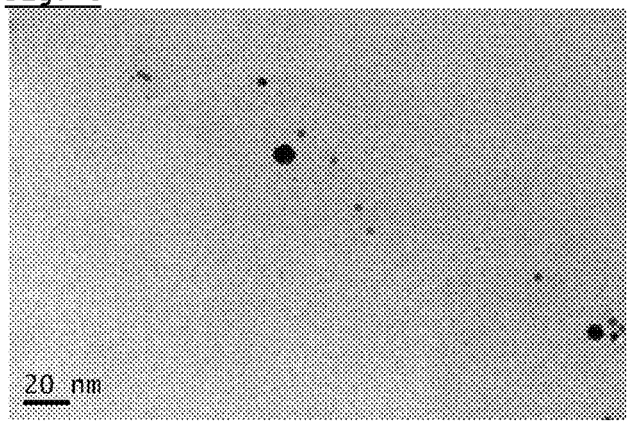
FIG. 4 is a TEM image of Au—Ni core nanoparticle stabilized with polvinylpyrrolidone prepared at Example 2 according to the present invention, in which mole ratio of core nanoparticle (i.e., Au and Ni) is 1:1.
Figure 5:
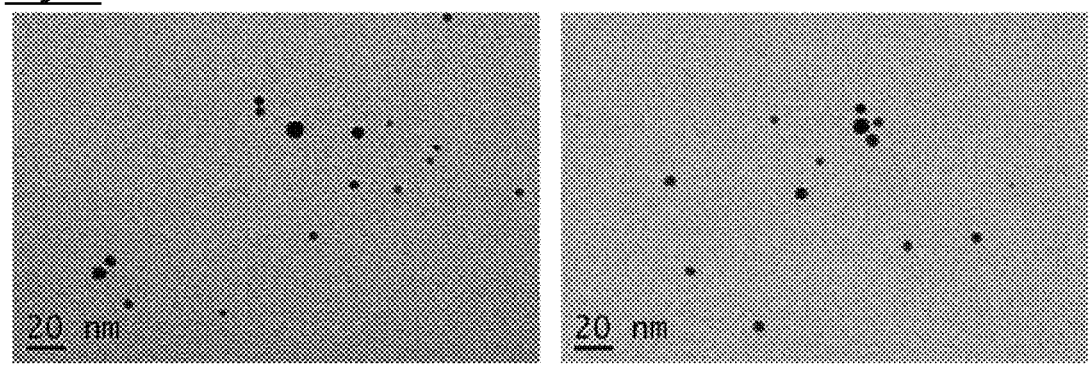
FIG. 5 is a TEM image of Au—Co core nanoparticle stabilized with polvinylpyrrolidone prepared at Example 3 according to the present invention, in which mole ratio of core nanoparticle (i.e., Au and Co) is 1:1.
Figure 6:
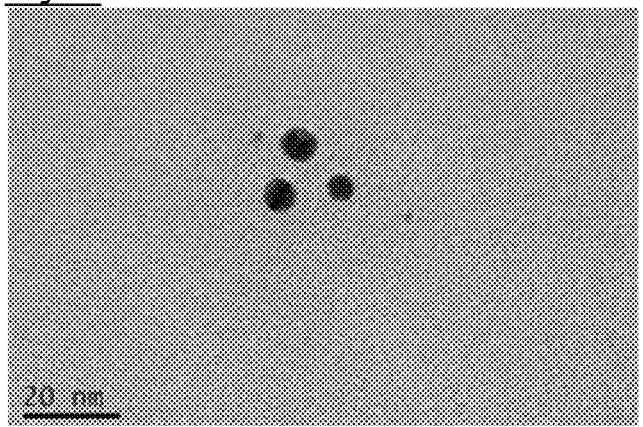
FIG. 6 is a TEM image of Au—Cu core nanoparticle stabilized with polyvinylpyrrolidone prepared at Example 4 according to the present invention, in which mole ratio of core nanoparticle (i.e., Au and Cu) is 1:1.
Figure 7:
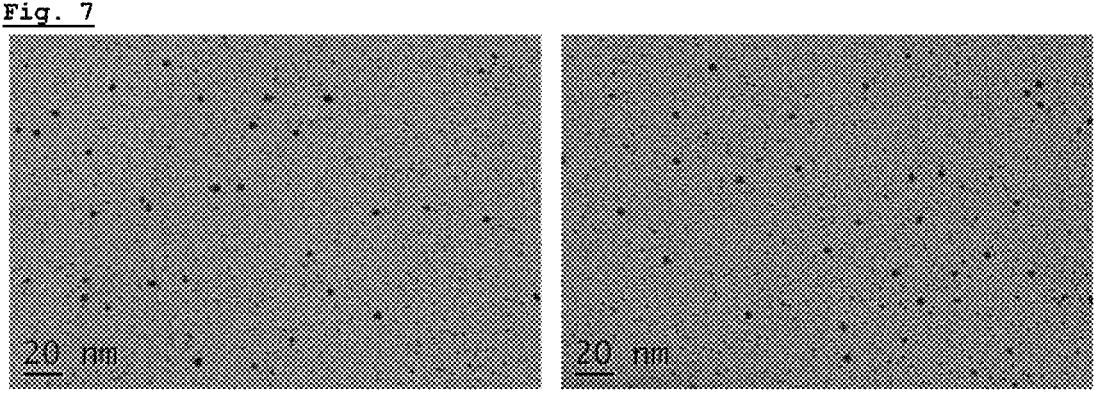
FIG. 7 is a TEM image of Au—Ir core nanoparticle stabilized with polyvinylpyrrolidone prepared at Example 5 according to the present invention, in which mole ratio of core nanoparticle (i.e., Au and Ir) is 1:1.

Nanoparticles prepared according to Examples 1 to 5 of the present invention were measured with TEM (JEOL, JEM-2010F, Japan), and the results are provided on FIGS. 2 to 7. Referring to FIG. 3, Au—Ag heteronuclear nanoparticle of Example 1 prepared according to an embodiment of the present invention include approximately 40 nm core and approximately 30 nm shell (FIG. 2: Example 1, FIG. 3: Example 1, FIG. 4: Example 2, FIG. 5: Example 3, FIG. 6: Example 4, FIG. 7: Example 5). The results indicated that the core-shell nanoparticle was prepared successfully.

2. Nanoparticle Component Analysis Using Energy Dispersive Spectroscopy (EDS)

Figure 8:
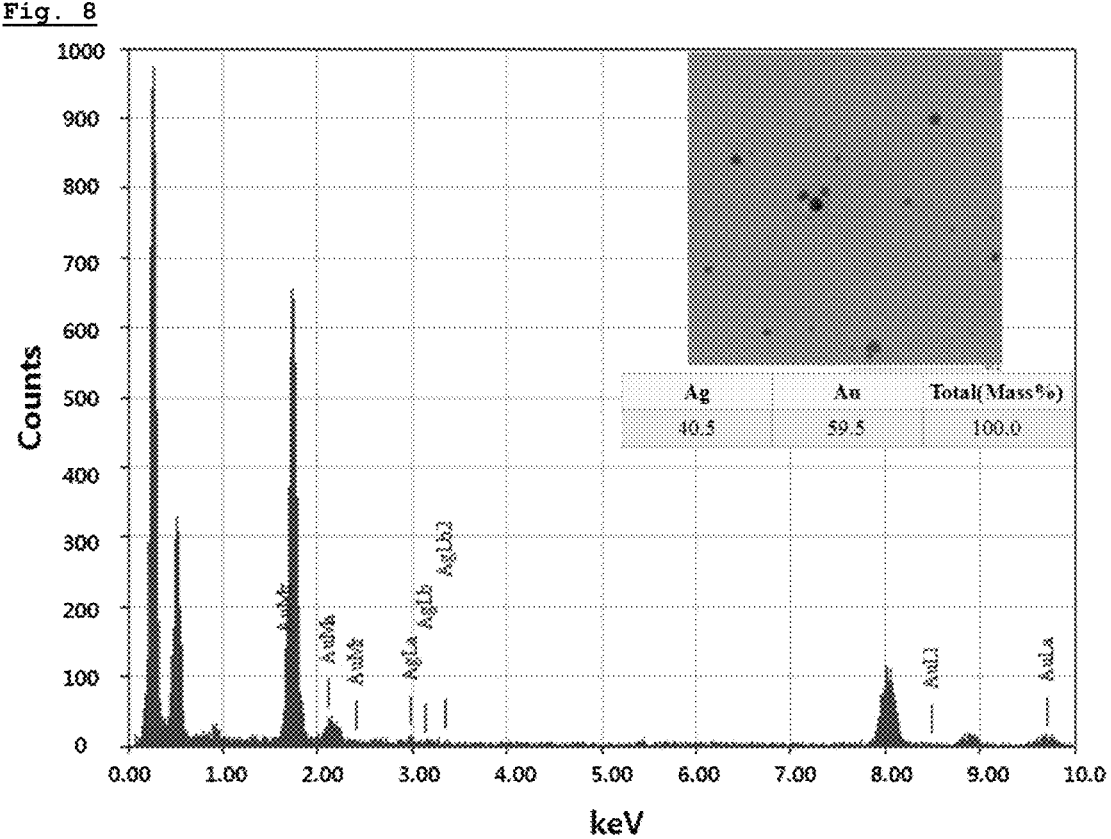
FIG. 8 is a result of EDS measurement of Au—Ag core nanoparticle stabilized with polvinylpyrrolidone prepared at Example 1 according to the present invention, in which mole ratio of core nanoparticle (i.e., Au and Ag) is 1:1.
Figure 9:
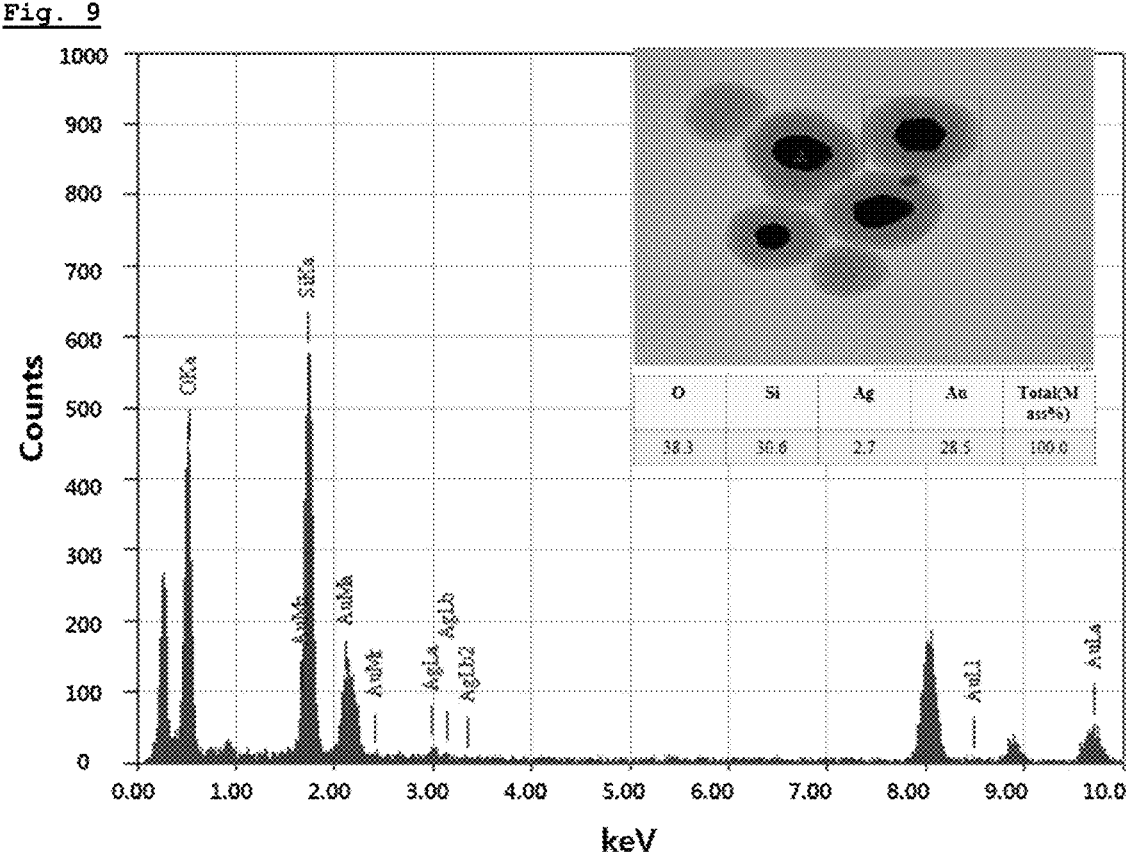
FIG. 9 is a result of EDS measurement of Au—Ag@$SiO_2$, which is the heteronuclear radioisotope nanoparticle of core-shell structure prepared at Example 1 according to the present invention.
Figure 10:
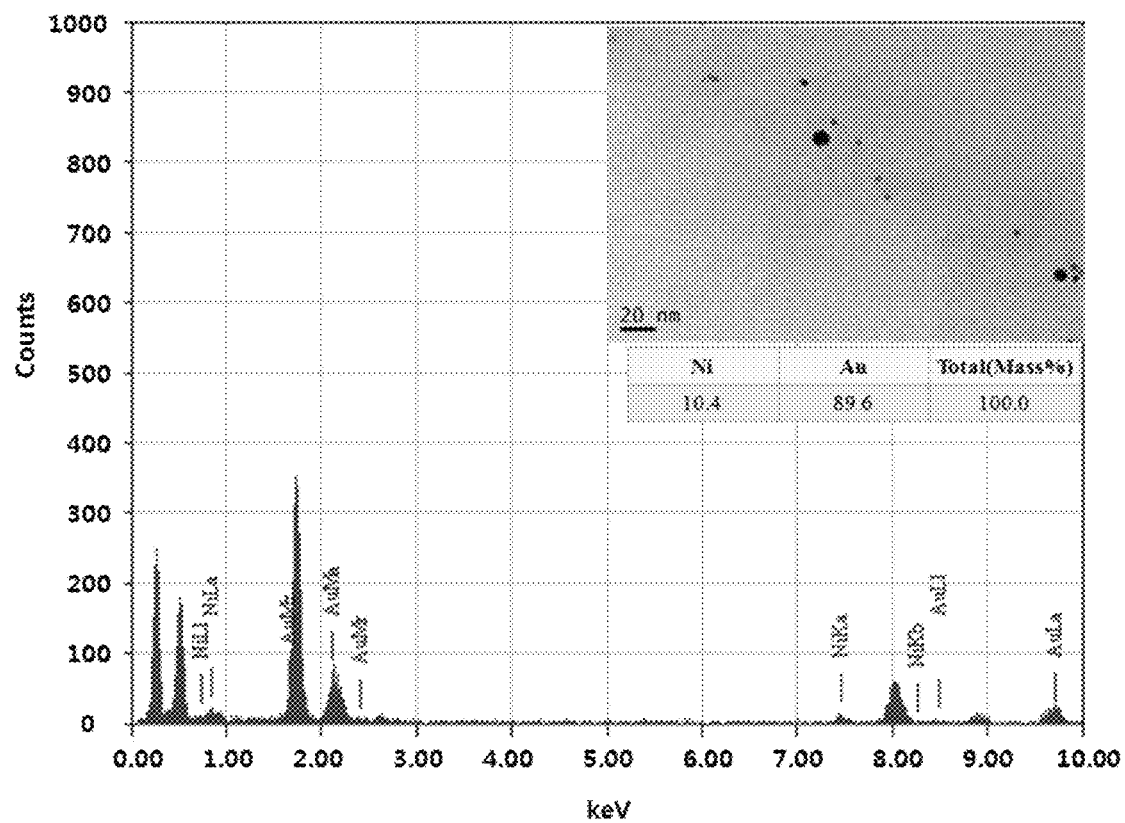
FIG. 10 is a result of EDS measurement of Au—Ni core nanoparticle stabilized with polvinylpyrrolidone prepared at Example 2 according to the present invention, in which mole ratio of core nanoparticle (i.e., Au and Ni) is 1:1.
Figure 11:
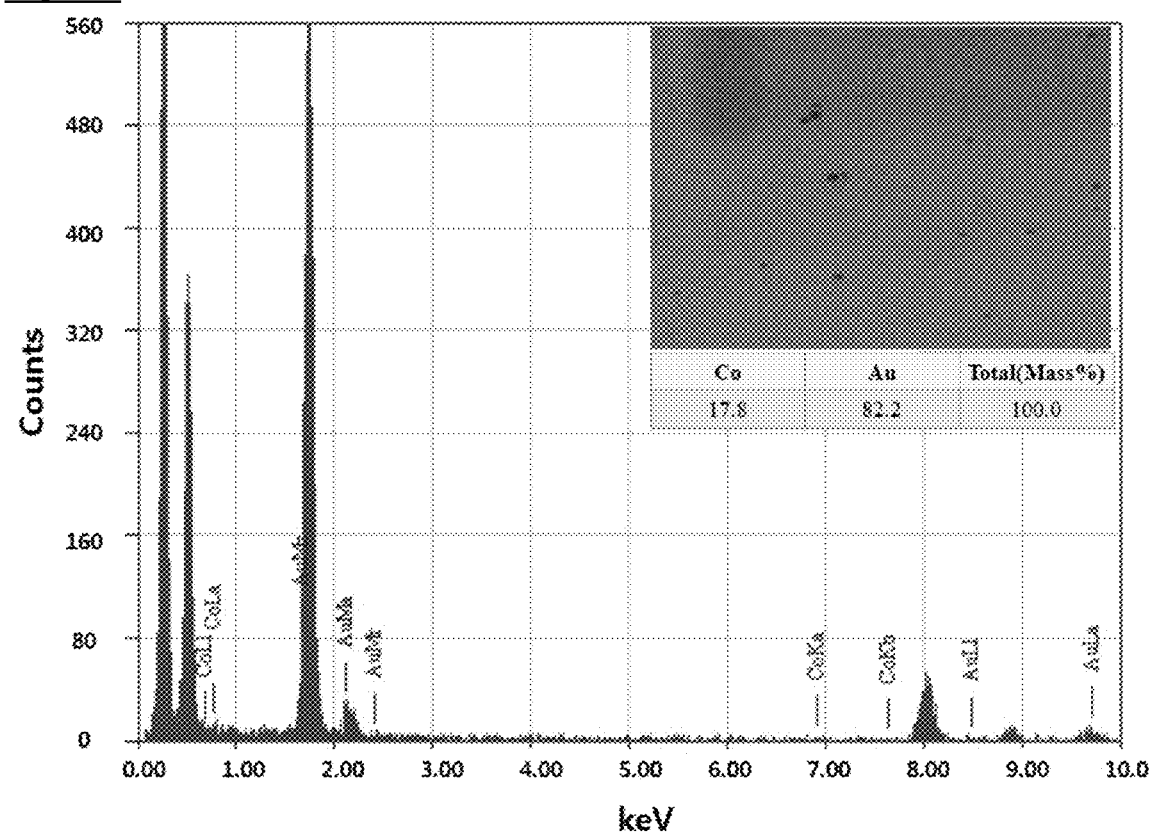
FIG. 11 is a result of EDS measurement of Au—Co core nanoparticle stabilized with polvinylpyrrolidone prepared at Example 3 according to the present invention, in which mole ratio of core nanoparticle (i.e., Au and Co) is 1:1.
Figure 12:
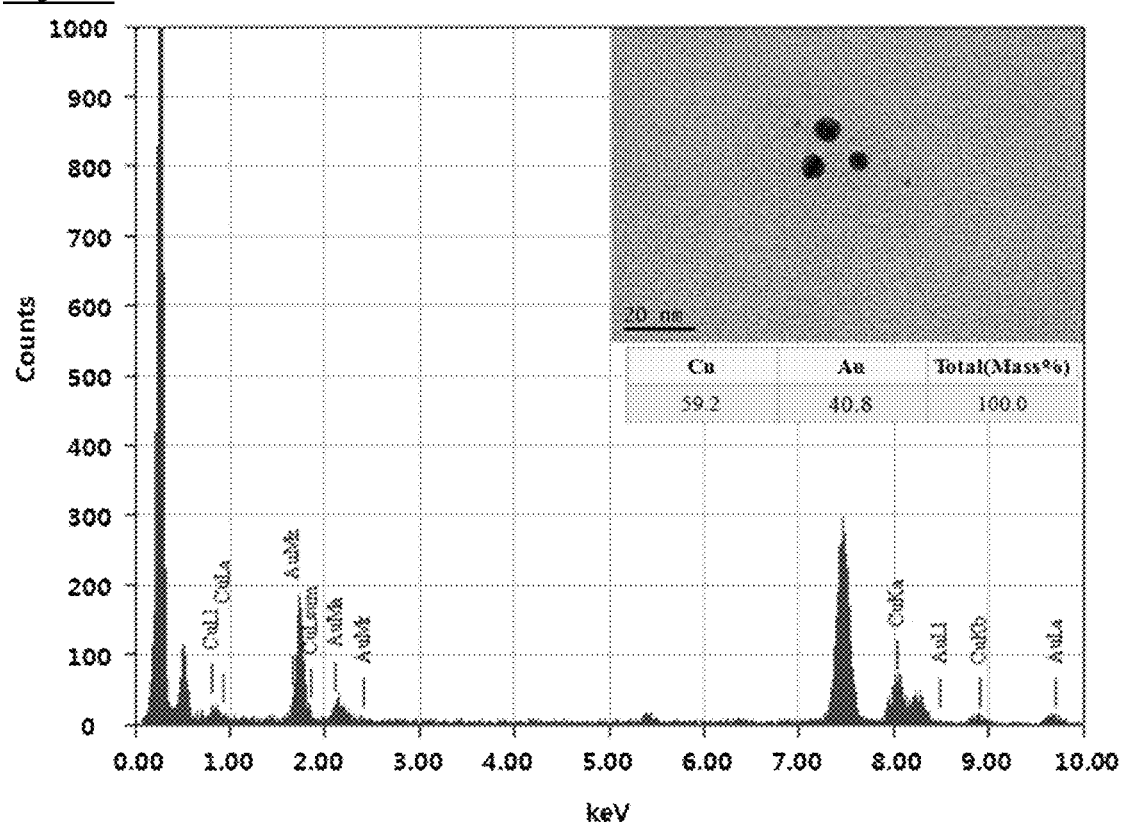
FIG. 12 is a result of EDS measurement of Au—Cu core nanoparticle stabilized with polvinylpyrrolidone prepared at Example 4 according to the present invention, in which mole ratio of core nanoparticle (i.e., Au and Cu) is 1:1.
Figure 13:
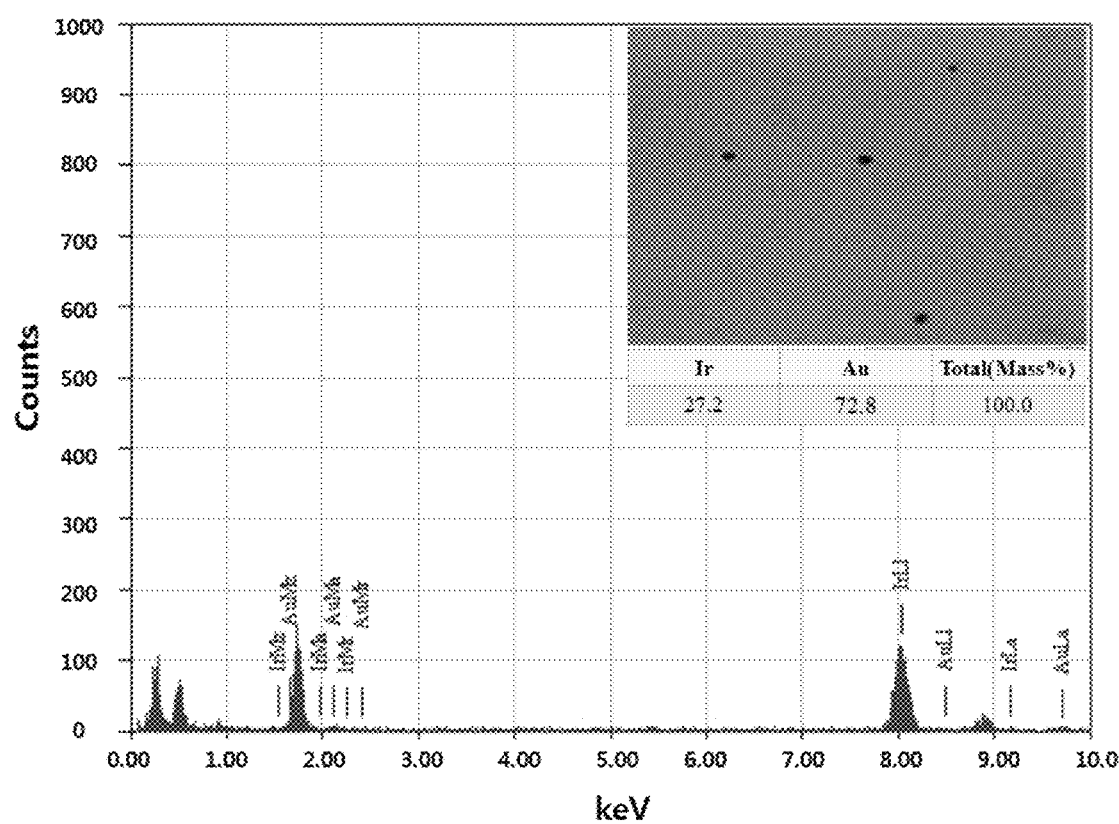
FIG. 13 is a result of EDS measurement of Au—Ir core nanoparticle stabilized with polvinylpyrrolidone prepared at Example 5 according to the present invention, in which mole ratio of core nanoparticle (i.e., Au and Ir) is 1:1.

Core or core-shell nanoparticles prepared according to Examples 1 to 5 were measured using EDS (JEM-2010F, Japan), and the results are provided on FIGS. 8 to 13 (FIG. 8: Example 1, FIG. 9: Example 1, FIG. 10: Example 2, FIG. 11: Example 3, FIG. 12: Example 4, FIG. 13: Example 5). The results indicated that the core-shell nanoparticle was prepared successfully.

3. Nanoparticle Analysis Using Grain Size Measurement (ELS)

Figure 14:
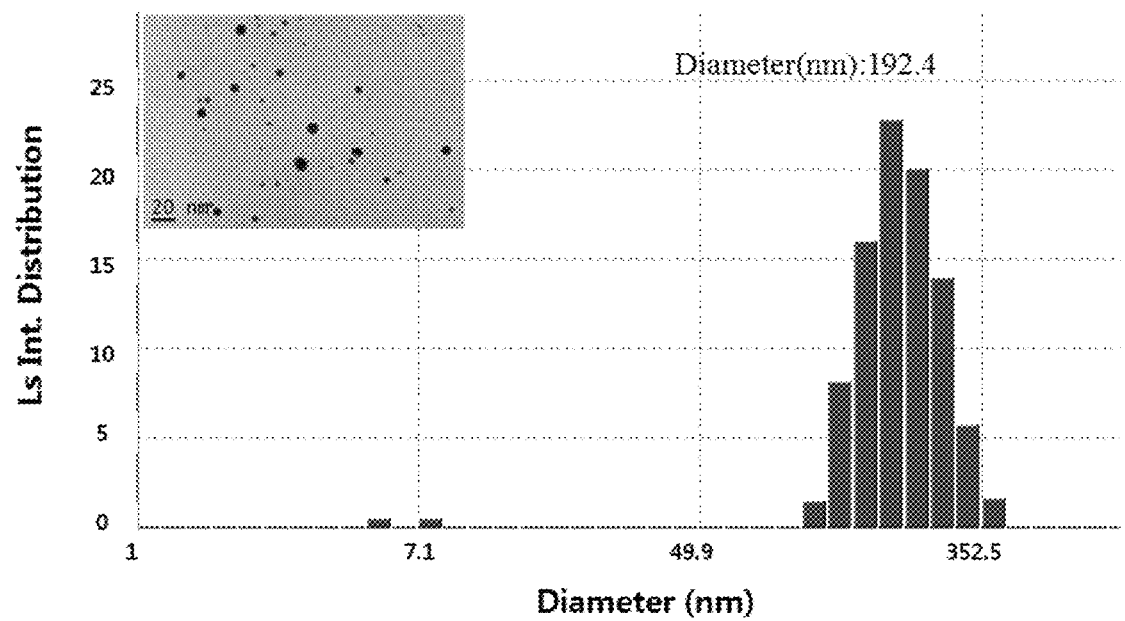
FIG. 14 is a result of ELS measurement of Au—Ag core nanoparticle stabilized with polvinylpyrrolidone prepared at Example 1 according to the present invention, in which mole ratio of core nanoparticle (i.e., Au and Co) is 1:1, and average granularity (D)=192.4 nm.
Figure 15:
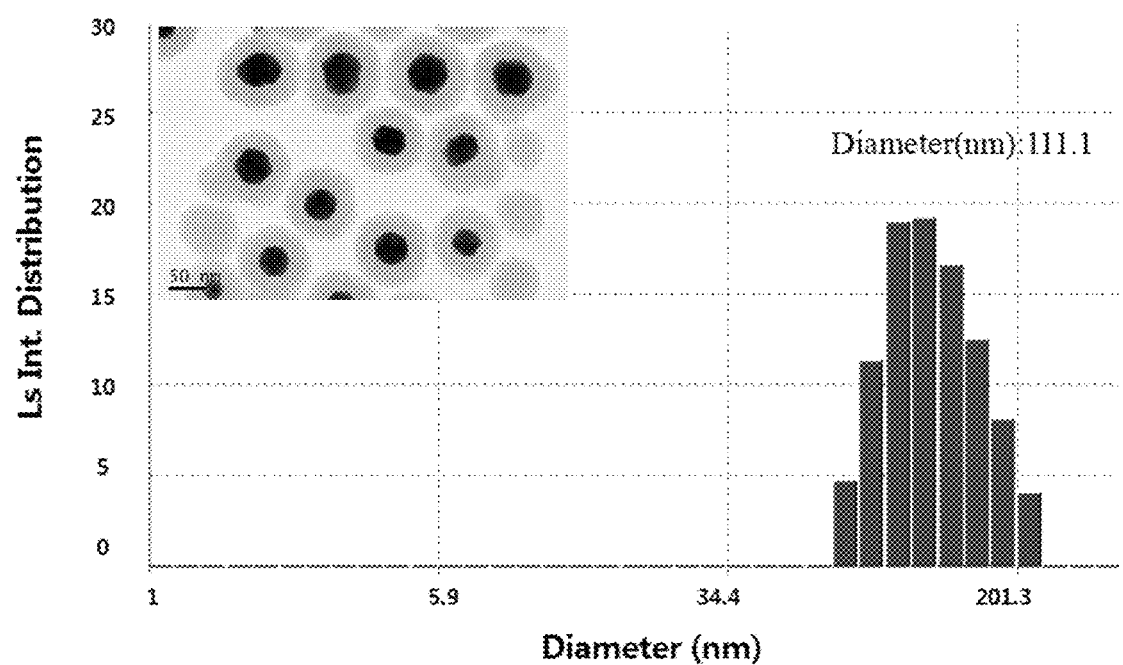
FIG. 15 is a result of ELS measurement of Au—Ag Au—Ag@$SiO_2$, which is the heteronuclear radioisotope nanoparticle of core-shell structure prepared at Example 1 according to the present invention, in which average granularity (D)=111.1 nm.
Figure 16:
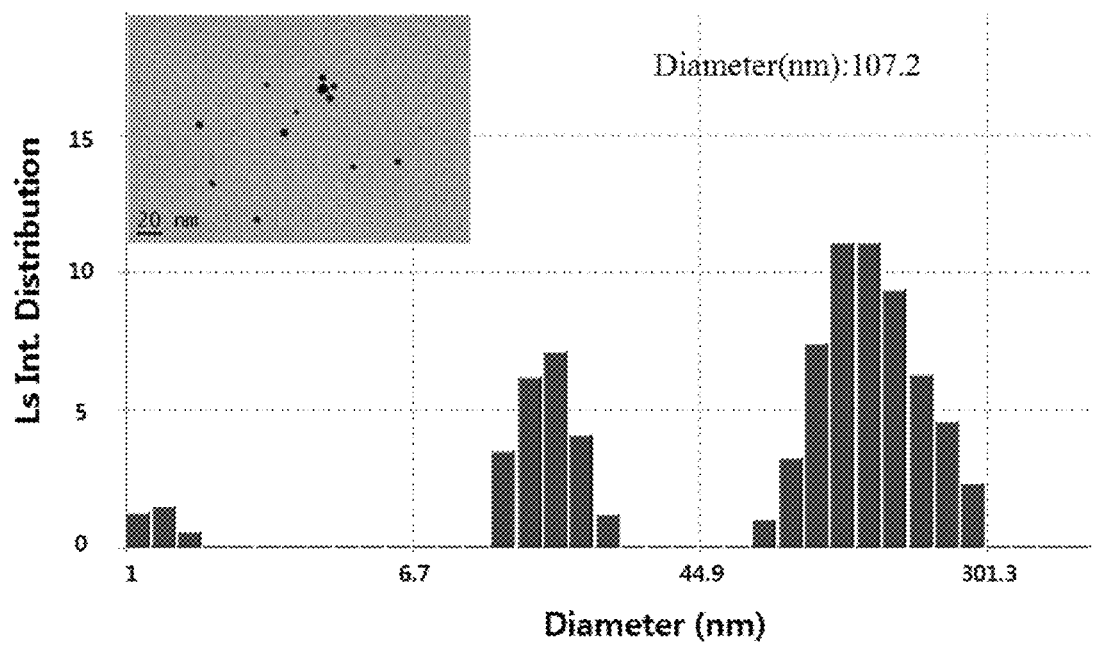
FIG. 16 is a result of ELS measurement of Au—Co core nanoparticle stabilized with polvinylpyrrolidone prepared at Example 3 according to the present invention, in which mole ratio of core nanoparticle (i.e., Au and Co) is 1:1, and average granularity (D)=107.2 nm.

Core or core-shell nanoparticles prepared according to Examples 1 and 3 were measured using ELS (ELS-8000, Otsuka Co., Japan), and the results are provided on FIGS. 14 to 16 (FIG. 14: Example 1, FIG. 15: Example 1, FIG. 16: Example 3). The results indicated that the core-shell nanoparticle was prepared successfully.

4. Core-Shell Nanoparticle Analysis Using UV-Visible Spectrophotometer

Figure 17:
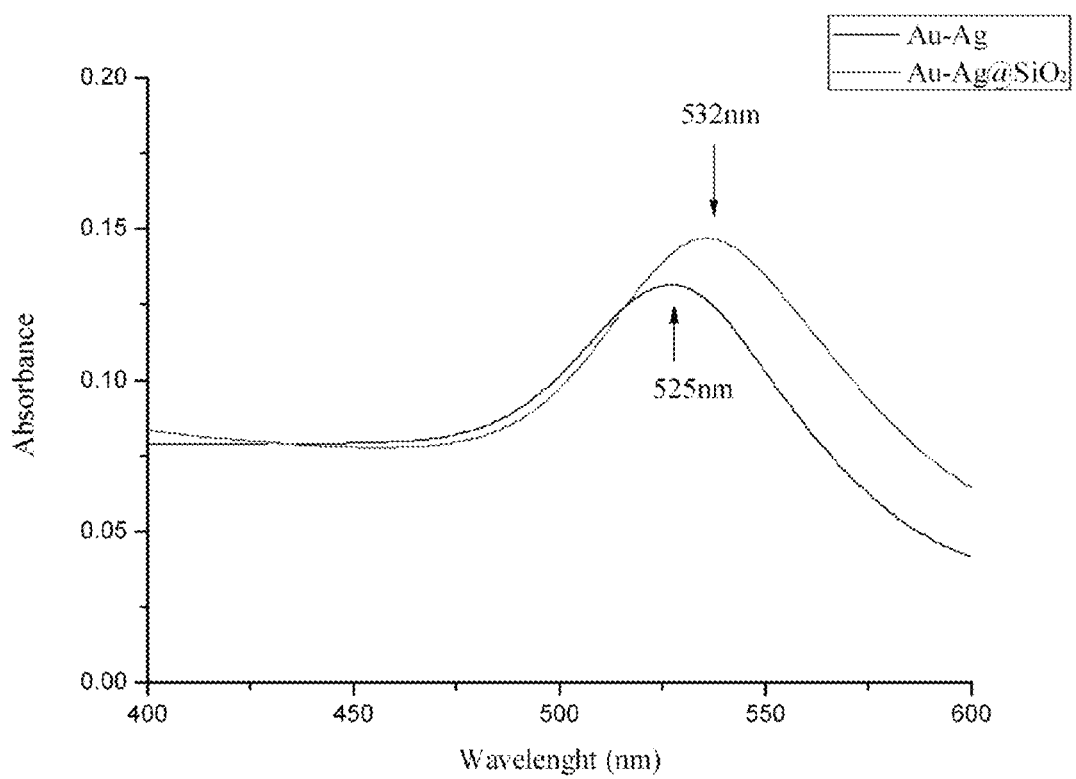
FIG. 17 is a result of UV-visible spectrophotometer of Au—Ag@SiO2 which is heteronuclear radioactive isotope of core-shell structure prepared at Example 1 according to the present invention.

Core-shell nanoparticle prepared according to Example 1 was measured using UV-Vis Spectrophotometer (Shimadzu UV-3101PC digital spectrophotometer, Kyoto, Japan), and the results are provided on FIG. 17. The results indicated that the core-shell nanoparticle was prepared successfully.

5. Core-Shell Nanoparticle Analysis Using Neutron Activation Analysis (NAA)

Figure 18:
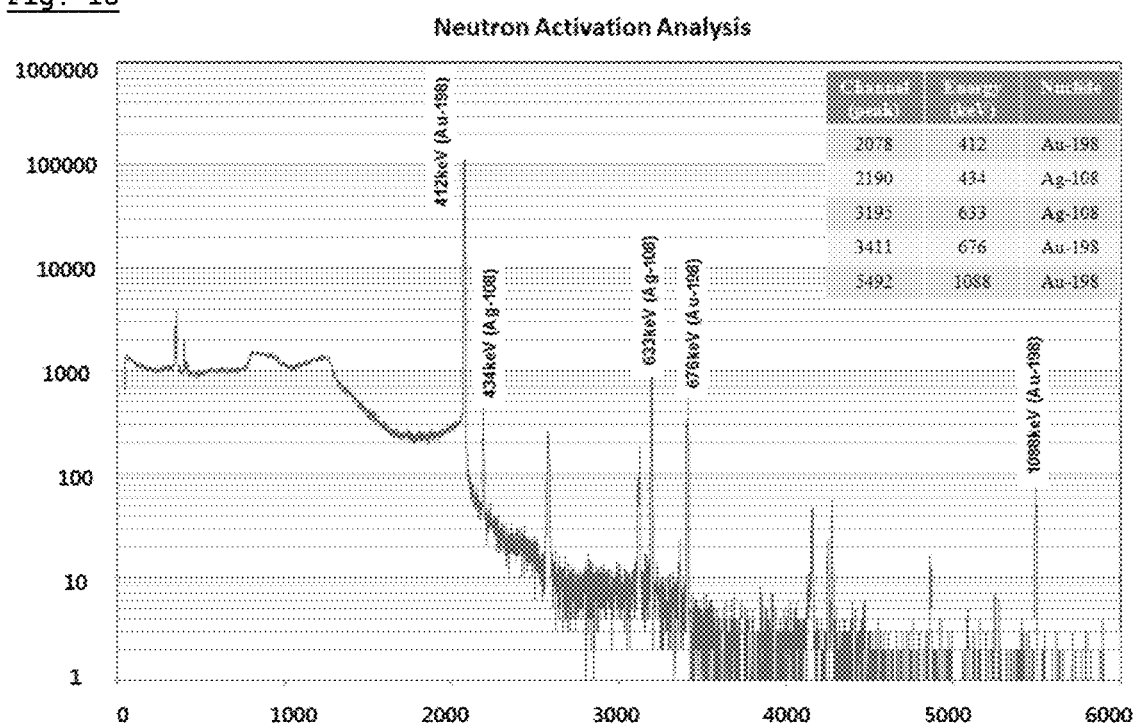
FIG. 18 is a result of NAA measurement of Au—Ag@SiO2 which is heteronuclear radioisotope of core-shell structure prepared at Example 1 according to the present invention.

Core-shell nanoparticle prepared according to Example 1 was measured using NAA (HPGe detector, EG&G Ortec, 25% relative efficiency, FWHM 1.85 keV at 1332 keV of $^{60}$Co), and the results are provided on FIG. 18. The results confirmed that no radioactive nuclides were generated except for Au and Ag by the neutron irradiation.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A method for analyzing multiphase flows comprising introduction of a tracer into the multiphase flows including a heteronuclear radioisotope nanoparticle of core-shell structure, comprising a single core comprising a mixture of two different radioisotopes selected from a group consisting of $^{198}$Au, $^{63}$Ni, $^{110m}$Ag, $^{64}$Cu, $^{60}$Co, $^{192}$Ir and $^{103}$Pd, and a shell comprising SiO$_2$ surrounding the core, then measuring an amount of radiation detection from each two different radioisotopes which are attenuated while passing through the multiphase flows.

2. The method for analyzing multiphase flows according to claim 1, wherein the core of the heteronuclear radioisotope nanoparticle comprises a combination of $^{198}$Au and one of the rest of the group except $^{198}$Au.

3. The method for analyzing multiphase flows according to claim 1, wherein the two different radioisotopes of the core emit radiations distinguished from each other.

4. The method for analyzing multiphase flows according to claim 1, wherein the multiphase flows are dual phases flows or triple phases flows.

5. The method for analyzing multiphase flows according to claim 1, wherein the method further comprises:
measuring an amount of radiation detection and obtaining attenuation coefficient of each component comprising the multiphase flows for the two different radiation energies;
obtaining a compound rate of the multiphase flows by applying the obtained attenuation coefficient to:

$$I_m(e) = I_v(e)\exp\left[-\sum_{i=1}^{3} \alpha_i \mu_i(e) d\right]$$

where, $I_u(e)$ denotes the amount of detected radiation before irradiation of two different radiation energies,
$\mu_i$ denotes linear attenuation coefficient with respect to component i within the multiphase flows,
$\alpha_i$ denotes the compound rate of the compound i according to absorption of radiation energy e,
d denotes the distance between the radioisotope and the detector, and
$I_m(e)$ denotes the detection amount of radiation energy e in the multiphase flows; and
obtaining a volume ratio of each component comprising the multiphase flows from the obtained compound rate of the multiphase flows.

* * * * *